United States Patent
Hammad et al.

(10) Patent No.: US 10,970,721 B2
(45) Date of Patent: Apr. 6, 2021

(54) SYSTEMS AND METHODS FOR SECURE MOBILE TRANSACTIONS

(71) Applicant: JPMorgan Chase Bank, N.A., New York, NY (US)

(72) Inventors: Ayman Hammad, Pleasanton, CA (US); Scott Ouellette, Kingston, NH (US); Michael Naggar, Orinda, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/373,036

(22) Filed: Apr. 2, 2019

(65) Prior Publication Data

US 2019/0228416 A1    Jul. 25, 2019

Related U.S. Application Data

(62) Division of application No. 15/088,437, filed on Apr. 1, 2016, now Pat. No. 10,290,003.

(51) Int. Cl.
| | |
|---|---|
| *G06Q 20/40* | (2012.01) |
| *G06Q 20/02* | (2012.01) |
| *G06Q 20/32* | (2012.01) |
| *G06Q 30/06* | (2012.01) |

(52) U.S. Cl.
CPC ......... *G06Q 20/4097* (2013.01); *G06Q 20/02* (2013.01); *G06Q 20/3224* (2013.01); *G06Q 20/401* (2013.01); *G06Q 30/0619* (2013.01)

(58) Field of Classification Search
CPC .............................. G06Q 20/40; G06Q 20/32
USPC ........................................................ 705/44
See application file for complete search history.

(56) References Cited

U.S. PATENT DOCUMENTS

| | | | | |
|---|---|---|---|---|
| 9,665,858 | B1* | 5/2017 | Kumar | G06Q 20/42 |
| 9,672,511 | B2* | 6/2017 | Lim | G06Q 20/3278 |
| 2001/0027422 | A1* | 10/2001 | Brandrud | H04M 15/00 |
| | | | | 705/26.9 |

(Continued)

OTHER PUBLICATIONS

U.S. Appl. No. 14/699,511, filed Apr. 2015, DeVan et al.
U.S. Appl. No. 15/069,458, filed Mar. 2016, Hammad et al.

*Primary Examiner* — Robert R Niquette
(74) *Attorney, Agent, or Firm* — Greenberg Traurig LLP

(57) ABSTRACT

Systems and methods for secure mobile transactions are disclosed. A method for conducting a transaction may include an issuer receiving, over a first network and from a customer mobile device, authentication information and mobile device location information; the issuer authenticating the customer, generating a transaction session identifier, and communicating the transaction session identifier to the mobile device over the first network; the issuer communicating, over a second network, the transaction session identifier and payment device information to an acquirer; the acquirer receiving, from the merchant, the transaction session identifier from the computer application, location information a merchant point of transaction, and transaction information; the acquirer generating a transaction authorization request including payment device information and the transaction information and communicating the request to the issuer portion over the second network; and the issuer authorizing the transaction authorization request. The issuer and acquirer may be under common control.

15 Claims, 3 Drawing Sheets

(56) References Cited

U.S. PATENT DOCUMENTS

| | | | | |
|---|---|---|---|---|
| 2013/0031004 A1* | 1/2013 | Dorsey | ............... | G06Q 40/02 |
| | | | | 705/44 |
| 2013/0159119 A1* | 6/2013 | Henderson | ........... | G06Q 20/325 |
| | | | | 705/21 |
| 2014/0304165 A1* | 10/2014 | Salomon | ............... | H04W 4/60 |
| | | | | 705/44 |
| 2015/0058125 A1* | 2/2015 | Moshfeghi | ............ | G06Q 30/02 |
| | | | | 705/14.58 |
| 2015/0170149 A1* | 6/2015 | Sharma | ............... | G06Q 20/027 |
| | | | | 705/44 |
| 2017/0262849 A1 | 9/2017 | Hammad et al. | | |
| 2019/0228416 A1* | 7/2019 | Hammad | ............ | G06Q 20/425 |

\* cited by examiner

SYSTEMS AND METHODS FOR SECURE MOBILE TRANSACTIONS

This application is a Divisional Application of U.S. Patent Application Ser. No. 15/088,437, filed Apr. 1, 2016, the disclosure of which is hereby incorporated by reference in its entirety.

BACKGROUND OF THE INVENTION

1. Field of the Invention

The present invention generally relates to systems and methods for secure mobile transactions.

2. Description of the Related Art

It is commonplace for customers to conduct transactions online using a mobile electronic device. For example, a customer may select an item and go to a "checkout screen" where the user then enters his or her credit card information, billing address, and shipping address. The merchant then provides this information to a financial institution to authorize the underlying transaction.

SUMMARY OF THE INVENTION

Systems and methods for secure mobile transactions are disclosed. In one embodiment, a payment system may include an acquirer portion, an issuer portion, and a mobile electronic device associated with a customer comprising at least one computer processor executing a computer application. The issuer portion and the acquirer portion may be associated with or under the control of a financial institution or a processing partner of the financial institution. An issuer computer processor for the issuer portion may receive over first network and from the mobile payment application, authentication information and location information for the mobile electronic device. It may authenticate the customer based on the authentication information, generates a transaction session identifier, and communicates the transaction session identifier to the computer application over the first network. It may further retrieve payment device information associated with the customer and communicate, over a second network, the transaction session identifier and the payment device information to the acquirer portion. The acquirer portion may receive, from the merchant, the transaction session identifier provided by the computer application, location information for a point of transaction at which a transaction is being conducted, and transaction information for the transaction. An acquirer computer processor may generate a transaction authorization request comprising the payment device information and the transaction information and communicates the transaction authorization request to the issuer portion over the second network. The issuer computer processor may authorize the transaction authorization request.

In one embodiment, the issuer computer processor may communicate, over the second network, the location information for the mobile electronic device, and the acquirer computer processor for the acquirer portion may validate the location information for the mobile electronic device and the location information for the point of transaction.

In one embodiment, the authentication information may comprise at least one of a username and password, and an identifier for the mobile electronic device.

In one embodiment, the transaction session identifier may uniquely identify a session in which the customer is authenticated.

In one embodiment, the transaction session identifier may be communicated to the computer application as an optical machine-readable code, by radio frequency communication, etc.

In one embodiment, the payment device information may include track 1 data or track 2 data for a credit card.

According to another embodiment, a method for conducting a transaction may include (1) an issuer computer processor for an issuer of a financial instrument receiving, over a first network and from a computer application executed by a mobile electronic device associated with the customer, authentication information and location information for the mobile electronic device; (2) the issuer computer processor authenticating the customer based on the authentication information, generating a transaction session identifier, and communicating the transaction session identifier to the computer application over the first network; (3) the issuer computer processor retrieving payment device information associated with the customer; (4) the issuer computer processor communicating, over a second network, the transaction session identifier and the payment device information to an acquirer; (5) the acquirer receiving, from the merchant, the transaction session identifier provided by the computer application, location information for a point of transaction at which a transaction is being conducted, and transaction information for the transaction; (6) an acquirer computer processor for the acquirer generating a transaction authorization request comprising the payment device information and the transaction information and communicating the transaction authorization request to the issuer portion over the second network; and (7) the issuer computer processor authorizing the transaction authorization request. At least one of the issuer and the acquirer may be associated with or under the control of a financial institution or a processing partner of the financial institution.

In one embodiment, the method may further include the issuer computer processor communicating, over the second network, the location information for the mobile electronic device, and the acquirer computer processor for the acquirer portion validating the location information for the mobile electronic device and the location information for the point of transaction.

In one embodiment, the authentication information may comprise at least one of a username and password, and an identifier for the mobile electronic device.

In one embodiment, the transaction session identifier may uniquely identify a session in which the customer is authenticated.

In one embodiment, the transaction session identifier may be communicated to the computer application as an optical machine-readable code, by radio frequency communication, etc.

In one embodiment, the payment device information may include track 1 data or track 2 data for a credit card.

According to another embodiment, a method for conducting a transaction may include (1) an issuer computer processor for an issuer of a financial instrument receiving, over a first network and from a computer application executed by a mobile electronic device associated with the customer, authentication information and location information for the mobile electronic device; (2) the issuer computer processor authenticating the customer based on the authentication information, generating a transaction session identifier, and communicating the transaction session identifier to the computer application over the first network; (3) the issuer computer processor receiving, from an acquirer and over a second network, a transaction authorization request, the transaction authorization request comprising the transaction session identifier, location information for a merchant point of transaction, (4) the issuer computer validating the location information for the mobile electronic device and the location information for the merchant point of transaction; and (5) the issuer computer processor authorizing the transaction based on the transaction session identifier received from the acquirer, the transaction session identifier generated by the issuer computer processor, and the transaction information.

In one embodiment, the authentication information may include at least one of a username and password, and a mobile device identifier.

In one embodiment, the transaction session identifier may uniquely identify a session in which the customer is authenticated.

In one embodiment, the transaction session identifier may be communicated to the computer application as an optical machine-readable code, by RF communication, etc.

In one embodiment, the payment device information may include at least one of track 1 data for a credit card and track 2 data for a credit card.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
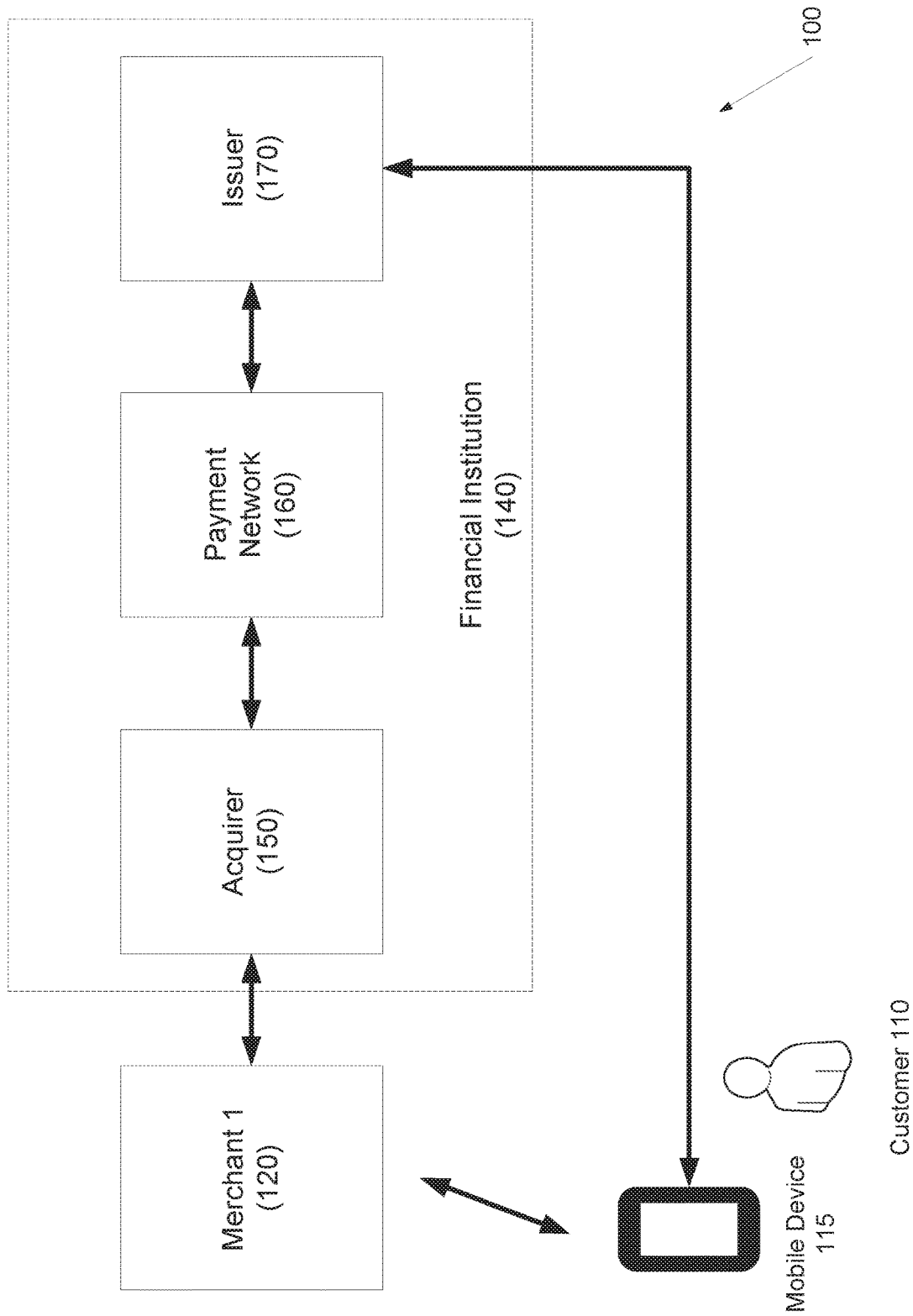
FIG. 1 depicts a system for secure mobile transactions according to one embodiment.
Figure 2:
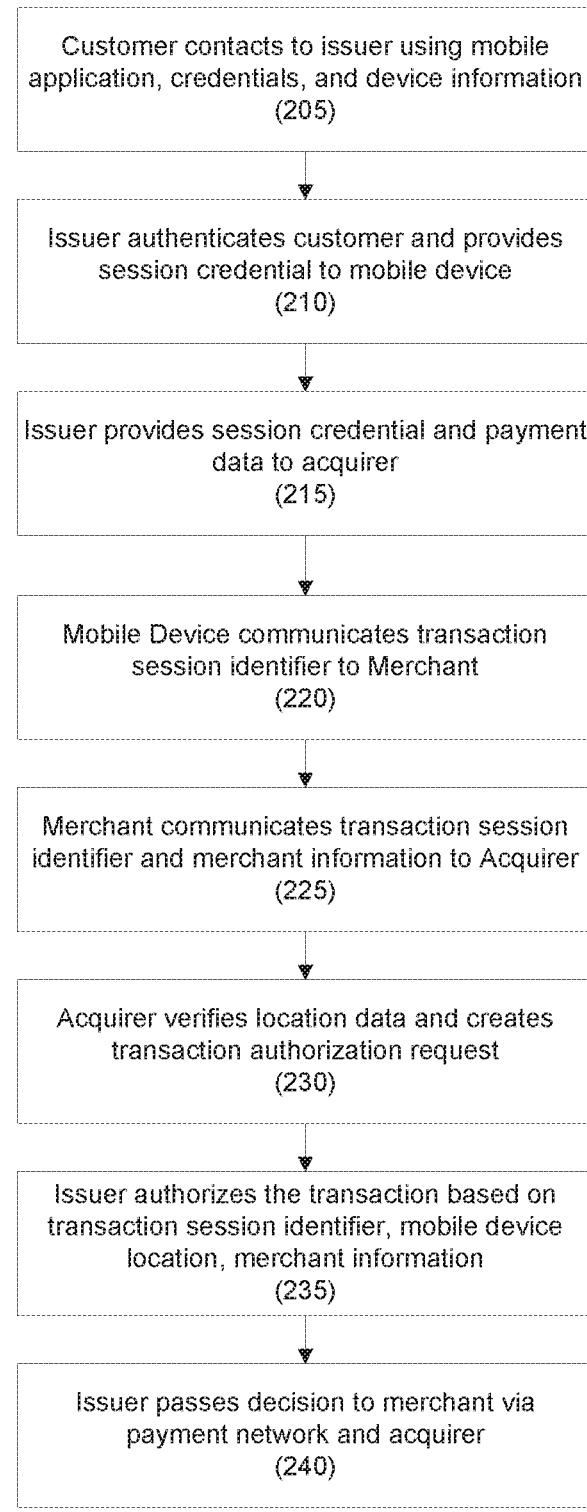
FIG. 2 depicts a method for secure mobile transactions according to one embodiment.
Figure 3:
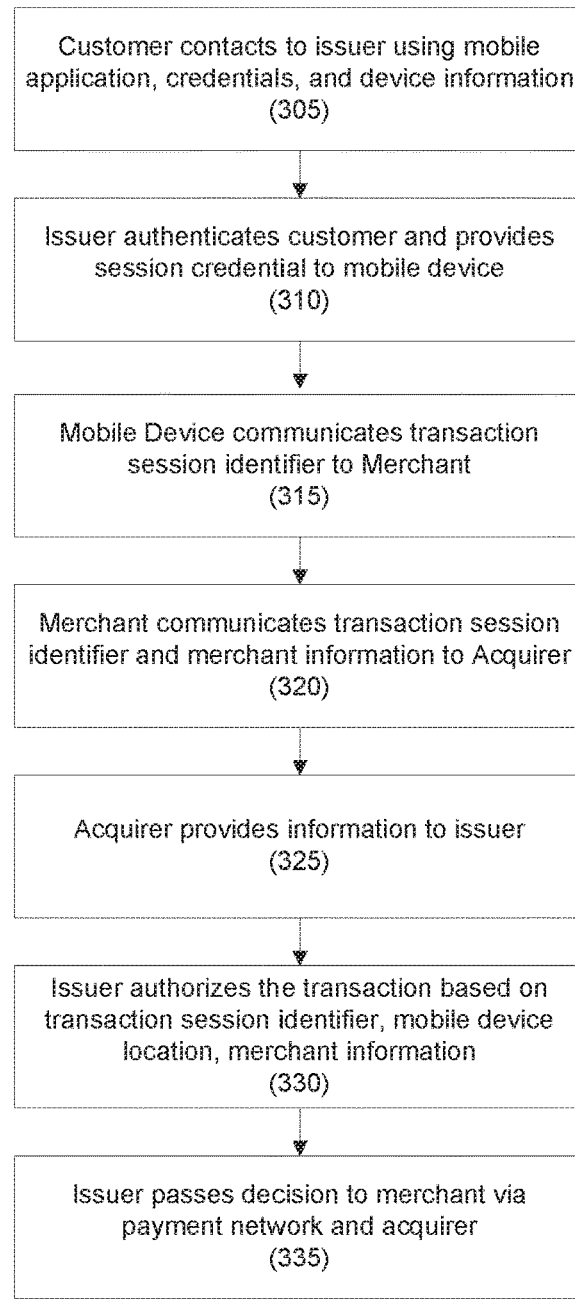
FIG. 3 depicts a method for secure mobile transactions according to one embodiment.

Several embodiments of the present invention and their advantages may be understood by referring to FIGS. 1-3.

Embodiments disclosed herein facilitate on-line transactions involving a mobile electronic device.

Embodiments disclosed herein may leverage capabilities of a closed loop system to conduct secure payment transactions without exposing a customer's payment account information (e.g., credit card number) to the merchant while maintaining the data needed to allow the merchant to successfully conduct the transaction.

Because the merchant may not be exposed to the customer's payment information, the merchant's payment card industry (PCI) burden may be reduced.

Embodiments may provide validation and confirmation at multiple steps.

Embodiments may include strong issuer-controlled authentication.

Referring to FIG. 1, a system for secure mobile transactions is disclosed according to one embodiment. System 100 may include customer 110, customer's mobile electronic device 115, merchant 120, and financial institution 140. In one embodiment, acquirer 150, payment network 160, and issuer 170 may all be associated with or under the control of financial institution 140 or a processing partner of financial institution 140.

In one embodiment, mobile electronic device 115 may execute a mobile payment application, a digital wallet, or access issuer 170's website. In addition, mobile electronic device 115 may communicate with merchant 120 using, for example, the mobile payment application, digital wallet, issuer 170's website, etc.

An example of a suitable payment application is Chase-Pay, provided by JPMorgan Chase & Co.

Customer 110 may interact with merchant 120 using mobile electronic device 115. Mobile electronic device 115 may be any suitable mobile electronic device that may execute a mobile wallet application, access a merchant website, execute a payment application, etc.

In one embodiment, merchant 120 may have a relationship with financial institution 140, such as a merchant-acquirer relationship.

In one embodiment, because acquirer 150, payment network 160, and issuer 170 may be part of, or under the control of, financial institution 140, decision making among these elements may be distributed. For example, acquirer 150 may compare the shipping address to the billing address; may compare the shipping address to the billing address; may compare the location of mobile electronic device 115 to a transaction location (e.g., the location of a point of transaction for merchant 120); may determine if there are suspicious number of deliveries to that email address; may determine if there are a suspicious number of transactions using the payment instrument with multiple merchants; may determine if there are a suspicious number of transactions from different IP addresses using the same payment instrument; may determine if the card is being used on a device with a proxy; etc.

In one embodiment, payment network 160 may be an enhanced payment network that may communicate additional data, such as device data, to the issuer. An example of such a payment network is ChaseNet. In one embodiment, payment network 160 may provide two-way communication from the merchant to the issuer that may provide portions of real-time authorization, portions of non-real time authorization, and combinations thereof. For example, transaction data may be provided in real-time to authorize the transaction, but if a shipping address does not match a billing address, a flag may be provided in real-time, but details on the discrepancy (e.g., the mismatched address) may be provided in due course.

In another embodiment, payment network 160 may provide direct communications between acquirer 150 and issuer 170.

In one embodiment, customer 110 may interact with issuer 170 directly using mobile electronic device 115. For example, mobile electronic device 115 may execute an application (not shown) associated with issuer 170, access issuer 170's mobile website, etc. In one embodiment, issuer 170 may identify and/or authenticate mobile electronic device 115 and/or customer 110 directly.

Referring to FIG. 2, a method of secure mobile transactions is disclosed according to one embodiment. In one embodiment, the method of FIG. 2 may be used, for example, when the issuer and acquirer are part of or under the control of the same financial institution, or a processing partner of financial institution. It should be noted, however, that the embodiment of FIG. 2 is not so limited In step 205, a customer using a mobile electronic device may contact an issuer with a transaction request using, for example, a mobile wallet application executed by the customer's mobile electronic device.

In one embodiment, the customer may provide the issuer with, for example, user id and password, touch ID authentication, biometric authentication, multifactor authentication, device fingerprinting, out-of-band authentication, etc. Any suitable identification/authentication method may be used as is necessary and/or desired.

In one embodiment, the identification/authentication process may provide direct communication between the issuer and the customer. It may further provide real-time authentication of the customer to the issuer.

In one embodiment, device information, such as device fingerprint data may be included and validated by the issuer as part of cross referencing a customer/trusted device pairing. Device fingerprint data may include, for example, operating system data (e.g., operating system version number, etc.), browser data (e.g., browser, version, etc.), locale data (e.g., country, language, etc.), hardware/system data (e.g., operating system, screen resolution, screen aspect ratio, manufacturer, serial number, SIM card, jailbreak information, etc.), settings data, cookie data, mobile application data, etc. It may further collect data from a mobile wallet application, such as user id and password. Other device data may be used as is necessary and/or desired.

In one embodiment, device location information (e.g., GPS data) at the time of contact may be provided to the issuer.

In step 210, the issuer may identify/authenticate the customer using the information received from the customer's mobile electronic device.

In one embodiment, a time stamp at the time of the authentication may be collected and used to establish a trust period, for calculating credentials and signatures, etc.

In one embodiment, the authentication may be coupled and/or linked to location and time period and other potential variables such as channel, etc.

In one embodiment, the issuer may perform additional checks, such as account take over checks, device jailbreak checks, etc.

In one embodiment, the issuer may generate an identifier, such as a transaction session identifier, for the transaction request. In one embodiment, the transaction session identifier may uniquely identify the transaction. In another embodiment, the transaction session identifier may uniquely identify a session in which the customer is authenticated. In another embodiment, the transaction session identifier may be active for a limited amount of time. The transaction session identifier may include, for example, a server component, a card transaction counter, a time stamp, a combination thereof, etc. In one embodiment, the transaction session identifier may be protected by a message authentication code as necessary and/or desired.

In one embodiment, the issuer may generate a payload that may include the transaction session identifier. In one embodiment, the payload may include additional elements, such as an application identifier for the mobile application, a code, such as machine-readable code (e.g., an optical code (e.g., QR code), version, timing validity parameters, the issuer's customer identifier for the customer, a checksum, etc. Other elements may be provided as necessary and/or desired.

In one embodiment, the issuer may provide the payload and/or transaction session identifier to the mobile electronic device following authentication.

In one embodiment, payment data for the selected, or default, payment device, card, etc. may be retrieved. For example, payment data may include, for example, track 1 and/or 2 data with no CVV, track 1 and/or 2 data with CVV, track 1 and/or 2 data with iCVV, track 1 and/or 2 data with dCVV, simplified chip data with a cryptogram, HCE chip data like with cryptogram, full chip data with cryptogram, etc.

In step 215, the issuer may provide the payload or transaction session identifier, payment data, and/or the mobile electronic device location information to the acquirer.

In step 220, the mobile electronic device may provide the payload or transaction session identifier to the merchant.

In one embodiment, the mobile electronic device may verify the integrity of the payload and may generate a code (e.g., a QR code) for the mobile electronic device to display or otherwise communicate to communicate the contents of the payload to the merchant point of transaction.

In one embodiment, the payload and/or transaction session identifier may be communicated by RF communication (e.g., NFC, Bluetooth, WiFi, etc.). Any other suitable manner for communicating the payload and/or transaction session identifier may be used as necessary and/or desired.

In step 225, the merchant point of transaction may receive the transaction session identifier and/or payload contents from the mobile device. In one embodiment, the merchant point of transaction may verify the integrity of the payload, and may inform the customer that the transaction is being processed.

The merchant (e.g., the merchant backend) may initiate an authorization request and may communicate that request to the acquirer.

In one embodiment, the authorization request may include the transaction session identifier, transaction details, and the merchant point of transaction location. Other information that may be provided include, for example: the application identifier for the mobile application, the code version, timing validity parameters, the issuer's customer identifier for the customer, an identifier for the point of transaction, a transaction amount, transaction details (e.g., items purchased), a merchant transaction identifier, a transaction time, and a signature.

In step 230, the acquirer may receive the transaction request from the merchant. In one embodiment, the acquirer may verify the integrity of the data received from the merchant. In one embodiment, the acquirer may validate the transaction location by comparing the mobile electronic device location received from the issuer to the terminal location.

In one embodiment, if the transaction location is not validated, the acquirer may reject the transaction.

In one embodiment, the acquirer may create an authorization request for the transaction based on the payment data received from the issuer.

The acquirer may pass the authorization request to the issuer via a payment network or any suitable communication channel. In one embodiment, the acquirer and the issuer may communicate directly.

In step 235, the issuer may authorize the transaction based on, for example, the transaction amount, the merchant information and profile, the customer financial standing, etc.

In step 240, the issuer may communicate the approval decision to the acquirer and/or merchant via the payment network.

Referring to FIG. 3, a method of secure mobile transactions is disclosed according to another embodiment. In one embodiment, the method may be used in scenarios where the acquirer and issuer are not associated with or under the control of the same financial institution or processing partner. It should be noted, however, that the embodiment of FIG. 3 is not so limited.

In step 305, a customer using a mobile electronic device may contact an issuer with a transaction request using, for example, a mobile wallet application executed by the customer's mobile electronic device. This may be similar to step 205, above.

In step 310, the issuer may identify/authenticate the customer using the information received from the customer's mobile electronic device. This may be similar to step 210, above.

In one embodiment, however, the issuer may not provide the acquirer with the transaction session identifier, payload, or the payment data.

In step 315, the mobile electronic device may provide the payload or transaction session identifier to the merchant. This may be similar to step 220, above.

In step 320, the merchant point of transaction may receive the transaction session identifier and/or payload contents from the mobile device, and may communicate transaction information to the acquirer. In one embodiment, the merchant point of transaction may verify the integrity of the payload, and may inform the customer that the transaction is being processed.

In one embodiment, the merchant may provide the acquirer with, for example, the transaction session identifier, transaction details, and the merchant point of transaction location. Other information that may be provided include, for example: the application identifier for the mobile application, the code version, timing validity parameters, the issuer's customer identifier for the customer, an identifier for the point of transaction, a transaction amount, transaction details (e.g., items purchased), a merchant transaction identifier, a transaction time, and a signature.

In step 325, the acquirer may provide the received information to the issuer. In one embodiment, the acquirer may create a transaction authorization request with the information available. In one embodiment, the acquirer may provide the transaction session identifier to the issuer in place of payment data.

In one embodiment, if the acquirer received location information for the mobile electronic device from the issuer (e.g., the acquirer is associated with or under the control of the financial institution or a processing partner of the financial institution), it may validate the transaction location by comparing the mobile electronic device location received from the issuer to the terminal location.

In one embodiment, if the transaction location is not validated, the acquirer may reject the transaction.

The acquirer may pass the authorization request to the issuer via a payment network, by direct communication, etc.

In step 330, the issuer may authorize the transaction based on, for example, the transaction amount, the merchant information and profile, the customer financial standing, etc. Prior to doing so, the issuer may retrieve payment data for the customer In one embodiment, the issuer may validate the transaction location by comparing the mobile electronic device location received from the issuer to the terminal location.

In step 335, the issuer may communicate the approval decision to the acquirer and/or merchant via the payment network.

Although several embodiments have been disclosed, it should be recognized that the embodiments are not necessarily exclusive.

The following documents are hereby incorporated, by reference, in their entireties: U.S. patent application Ser. No. 14/699,511, U.S. Provisional Patent Application Ser. No. 62/148,493, filed Apr. 16, 2015; U.S. Provisional Patent Application Ser. No. 62/107,800, filed Jan. 26, 2015; and U.S. Provisional Patent Application Ser. No. 62/037,891, filed Aug. 15, 2014; U.S. patent application Ser. No. 15/069,418 filed Mar. 14, 2016; and U.S. patent application Ser. No. 15/069,458 filed Mar. 14, 2016.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducting a transaction, comprising:
   an issuer computer processor for an issuer receiving, over a first network and from a computer application executed by a mobile electronic device associated with the customer, authentication information and location information for the mobile electronic device;
   the issuer computer processor authenticating the customer based on the authentication information, generating a transaction session identifier, and communicating the transaction session identifier to the computer application over the first network;
   the issuer computer processor receiving, from an acquirer and over a second network, a transaction authorization request, the transaction authorization request comprising the transaction session identifier, location information for a merchant point of transaction;
   the issuer computer validating the location information for the mobile electronic device and the location information for the merchant point of transaction; and
   the issuer computer processor authorizing the transaction based on the transaction session identifier received from the acquirer, the transaction session identifier generated by the issuer computer processor, and the transaction information.

2. The method of claim 1, wherein the authentication information comprises at least one of a username and password, and a mobile device identifier.

3. The method of claim 1, wherein the transaction session identifier uniquely identifies a session in which the customer is authenticated.

4. The method of claim 1, wherein the transaction session identifier is communicated to the computer application as an optical machine-readable code.

5. The method of claim 1, wherein the transaction session identifier is communicated to the computer application by radio frequency communication.

6. The method of claim 1, wherein the payment device information comprises track 1 data or track 2 data for a credit card.

7. The method of claim 1, wherein the issuer portion and the acquirer portion are associated with or under the control of a financial institution or a processing partner of the financial institution.

8. A payment system, comprising:
   an acquirer portion;
   an issuer portion; and
   a mobile electronic device associated with a customer comprising at least one computer processor executing a computer application;
   wherein:
      an issuer computer processor for the issuer potion receives, over a first network and from the computer application, authentication information and location information for the mobile electronic device;
      the issuer computer processor authenticates the customer based on the authentication information, generating a transaction session identifier, and communicates the transaction session identifier to the computer application over the first network;
      the acquirer portion receives, from a merchant, the transaction session identifier provided by the computer application, location information for a point of transaction at which a transaction is being conducted, and transaction information for the transaction;
      an acquirer computer processor for the acquirer portion generates a transaction authorization request comprising the payment device information and the transaction information and communicates the transaction authorization request to the issuer portion over the second network; and
      the issuer computer processor receives, from the acquirer portion and over a second network, the transaction authorization request;
      the issuer computer validates the location information for the mobile electronic device and the location information for the merchant point of transaction; and
      the issuer computer processor authorizes the transaction based on the transaction session identifier received from the acquirer, the transaction session identifier generated by the issuer computer processor, and the transaction information.

9. The payment system of claim 8, wherein the issuer computer processor communicates, over the second network, the location information for the mobile electronic device; and
   the acquirer computer processor for the acquirer portion validates the location information for the mobile electronic device and the location information for the point of transaction.

10. The payment system of claim 8, wherein the authentication information comprises at least one of a username and password, and an identifier for the mobile electronic device.

11. The payment system of claim 8, wherein the transaction session identifier uniquely identifies a session in which the customer is authenticated.

12. The payment system of claim 8, wherein the transaction session identifier is communicated to the computer application as an optical machine-readable code.

13. The payment system of claim 8, wherein the transaction session identifier is communicated to the computer application by radio frequency communication.

14. The payment system of claim 8, wherein the payment device information comprises track 1 data or track 2 data for a credit card.

15. The payment system of claim 8, wherein the issuer portion and the acquirer portion are associated with or under the control of a financial institution or a processing partner of the financial institution.

\* \* \* \* \*